Jan. 31, 1967   B. M. CARDER   3,301,345
SEISMIC SURVEY SYSTEM

Filed Feb. 8, 1965   4 Sheets-Sheet 1

BRUCE M. CARDER
*INVENTOR.*

BY Cadwallader, Kelly &
Dacey

ATTORNEYS

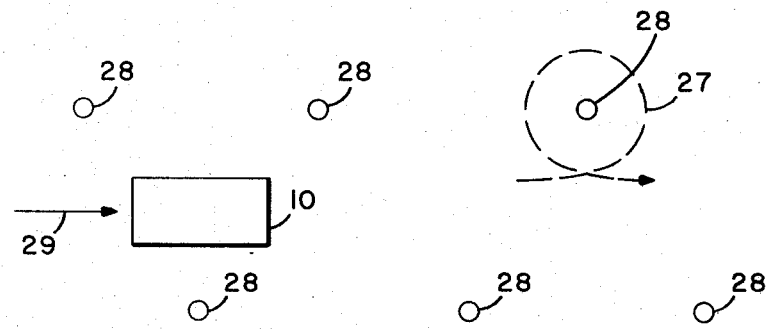
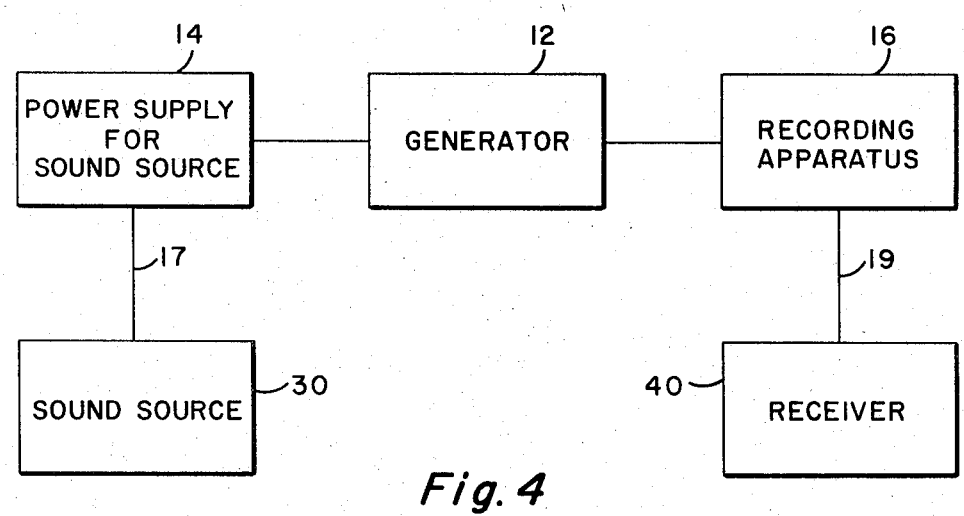
Fig. 3
Fig. 4
BRUCE M. CARDER
INVENTOR.

Jan. 31, 1967

B. M. CARDER 3,301,345

SEISMIC SURVEY SYSTEM

Filed Feb. 8, 1965

BRUCE M. CARDER
*INVENTOR.*

BY Cadwallader, Kelly & Dace

ATTORNEYS

Jan. 31, 1967  B. M. CARDER  3,301,345
SEISMIC SURVEY SYSTEM
Filed Feb. 8, 1965  4 Sheets-Sheet 4

BRUCE M. CARDER
*INVENTOR.*

BY Cadwallader, Kelly &
Dacey
*ATTORNEYS*

United States Patent Office 3,301,345
Patented Jan. 31, 1967

3,301,345
SEISMIC SURVEY SYSTEM
Bruce M. Carder, Las Vegas, Nev., assignor to Edgerton, Germeshausen & Grier, Inc., Bedford, Mass., a corporation of Massachusetts
Filed Feb. 8, 1965, Ser. No. 430,858
5 Claims. (Cl. 181—.5)

The present invention relates generally to seismic survey systems and, more particularly, to apparatus for obtaining seismic profiles of the contours of strata of interest lying below the surface of the earth. The present invention permits the adaptation and use of conventional marine seismic profiling systems directly to land use in a novel manner.

Heretofore, sound impulses used for seismic profiling over land have been coupled into the ground by using a sound source mounted within a liquid filled tank provided with a rubber diaphragm separating the liquid from the surface of the earth. Systems such as these are cumbersome in that the entire equipment, including the liquid filled tank, will have to be either emptied or lifted as such and moved from location to location, making for difficult, time consuming and expensive operation whose expenses mount with increasing distances to be surveyed. (One such system has recently been described in the August 17, 1964, issue of The Oil and Gas Journal, pp. 68–69, "New Seismic Tool Uses Electrical 'Pop.'")

Seismic profiling systems operating over water have been more efficient since both the sound source and the receiver are normally mounted on a floating support, such as a ship, that is continuously being propelled over the course desired to be charted. The ship also carries all necessary power systems as well as supporting equipment required to obtain continuous survey records. Furthermore, such survey records are almost immediately available for analysis by qualified personnel aboard the ship. The present invention adapts some of these known water surveying means to land use.

It is, therefore, an object of the present invention to provide a continuous seismic profiling system and method for obtaining records of the contours of strata lying below the surface of the earth while the system of the invention is being continuously moved along the surface of the earth at a predetermined speed. It is another object of the present invention to provide a continuous seismic profiling system and method that will permit the obtaining of continuous records without the necessity for physically lifting a liquid filled tank in between transmissions of sound impulses. It is a further object of the present invention to provide a continuous seismic surveying system and method which is characterized by improved performance at much reduced cost.

Other and further objects of the invention will in part be obvious and will in part appear hereinafter.

The invention accordingly comprises the improved continuous seismic surveying system and method possessing the construction, combination of elements, and arrangement of parts which are exemplified in the following detailed disclosure, and the scope of which will be indicated in the appended claims.

For a fuller understanding of the nature and objects of the invention, reference should be had to the following detailed description, taken in connection with accompanying drawings wherein:

FIGURE 3 is a schematic view of a further method of obtaining continuous seismic profiling records in accordance with the teachings of the invention;

FIGURE 4 is a block diagram of a seismic profiling system according to the invention;

In general, the continuous seismic profiling system comprises: a means for generating sound impulses mounted in a liquid medium contained within a first hollow rotatable member as the member is continuously being moved along the surface of the earth; a means for receiving reflected sound impulses which may also be mounted in a liquid medium contained in a second hollow rotatable member; or which may be stationarily positioned on the surface of the earth; power supply means for operating the system; and means for converting the received reflected sound impulses into a continuous survey record.

Figure 1:
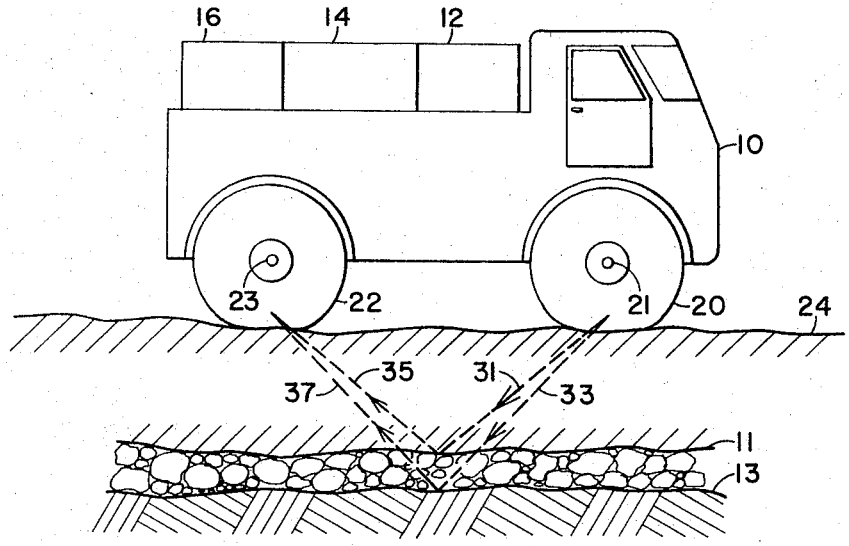
FIGURE 1 is a side elevational view of a self-contained and self-propelled seismic profiling system for use over land, showing also a portion of the crust of the earth, in vertical section, with representative substrata whose contours are intended to be reproduced on a chart.

Referring to the drawings in which like reference characters refer to like parts throughout and in particular to FIGURE 1, there is shown a self-contained and self-propelled seismic profiling system for use over land and constructed in accordance with and embodying the present invention. The seismic profiling system of FIGURE 1 essentially comprises a vehicular means 10 designed to accommodate therein all of the required operative parts of the system and also carrying the personnel necessary to operate the system. The system employs a power supply, such as a generator 12, which may be a conventional diesel electric generator or a battery or any other means designed to supply electrical energy for the operation of the system. Generator 12 basically supplies power for a power supply 14 intended for driving a sound generating source. This power supply 14 may comprise, for example, a capacitor bank together with its associated circuitry, and is connected to a sound generating source, as will be more apparent herein below.

Generator 12 also supplies the necessary power for driving a suitable recording apparatus 16, which may be any conventional recording apparatus used in marine seismic profiling on board ships for preparing continuous survey charts. The input signals to the recording apparatus 16 are transmitted thereto from a receiver, as will be more apparent from the following disclosure. The vehicular means 10 is preferably constructed substantially as shown in FIGURE 1. It may be constructed, however, if so desired to contain only the sound source, receiver, power supply and recording unit, while having the necessary locomotion imparted thereto by independent means. The vehicular means 10 is preferably designed and constructed to move over any sort of terrain normally found in areas to be surveyed whether it be flat land, or hilly and rocky country, or marsh land. The vehicular means 10 is made to travel on rotatable members 20 and 22 that represent respectively, the front and rear tires of the vehicle. These rotatable members 20 and 22 are specially designed, oversized tires that are filled with a liquid medium, such as salt water, oil or any other non-compressible fluid and are also intended for containing the sound source and receiver means, respectively.

Thus, rotatable members 20 and 22 perform, in fact, two functions; that of imparting locomotion to the vehicle 10 and that of serving as containers for the sound source and receiver means of the seismic surveying system of the invention.

The vehicle 10 may have only two of these tires or members 20 and 22, one in front and one in the rear, or it may be designed as a conventional four-wheeled vehicle with two of these special tires mounted in front and two in the rear. These hollow rotatable members or tires 20 and 22 are designed for rotation about their respective axles 21 and 23, on which the frame or chassis of the vehicle 10 is mounted. Either or both of these front and rear members 20 and 22 may be designed for providing the driving force of motion to the vehicle 10. The necessary rotary motion may be imparted to the members 20 and 22 in any conventional known manner, keeping in mind the particular respective use of the vehicle 10 with regard to the terrain to be surveyed, such as steepness of the slopes and the composition of the surface of the earth.

Figure 2:
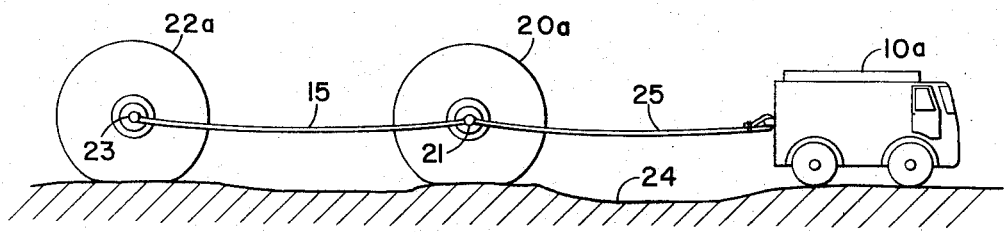
FIGURE 2 depicts a modification in the continuous seismic profiling system of the invention in which the sound source and the receiving element are separated from the vehicular means moving them along the surface of the earth.

One of these hollow rotatable members is intended to contain the sound source for generating sound impulses in the liquid medium contained within the member and for coupling the generated sound impulses into the ground 24 by the rubber surface of the tire 20, serving as a continuously rotating diaphragm as the vehicular means 10 moves along the surface of the earth. As may be noted in FIGURE 1, these generated sound impulse waves, shown in the drawing by lines 31 and 33, penetrate into the ground 24 until they strike the particular substrata of interest 11 and 13 from which they are reflected as shown by lines 35 and 37 to a receiver means located in the other rotatable member 22. Electrical signals generated by the receiver means responsive to these reflected pulses 35 and 37 are then transmitted from the receiver to the recording apparatus 16, which then produces a continuous seismic survey record of the substrata of the earth as the vehicle 10 is moving along the surface of the earth. The survey record obtained is highly accurate and, since it is readily available simultaneously with the run being made, it may be interpreted at the time the site is being charted. In FIGURE 2 is shown two rotatable members 20a and 22a carrying the sound source and receiver and being pulled in a detachable manner by a vehicle 10a. It must be pointed out that while only one receiver means is shown as being utilized in FIGURES 1 and 2, as many receiver means may be used in the system of the invention as may be desired, provided always that for each such additional receiver means an additional hollow rotatable member is utilized. Such additional hollow rotatable members may be conveniently towed behind the members 22 or 22a, as the case may be, by suitable connecting means (not shown).

The two rotatable members 20a and 22a are positioned in spaced apart relationship to one another, which distance is continuously being maintained in a convenient manner, such as by a connecting rod 15 while the system is being towed by a vehicle 10a. The vehicle 10a, in turn, may be detachably coupled to the rotatable members 20a and 22a by a cable 25. The electrical connections to the sound source and receiver means respectively contained within rotatable members 20a and 22a, are of course carried by these connecting means 15 and 25 to the power supply and recording apparatus mounted on the vehicle 10a.

FIGURE 3 depicts, in a schematic way, a further method of obtaining continuous seismic survey records in which a self-contained and self-propelled vehicle 10 may be moved in between two rows of seismic receivers 28 as shown by the direction of the arrow 29. These seismic receivers 28 may be geophones selectively positioned over the surfaces to be charted.

In this method, sound impulses are generated and coupled into the ground from the vehicle 10 in like manner as shown and described with reference to FIGURE 1. The reflected waves, however, are not received in the moving vehicle 10, but instead are received by these respective geophones 28. The vehicle 10 may move in between these rows of geophones 28 as shown by the arrow 29 or for certain specialized applications, the vehicle 10 may be moved in circular motions about one or more of these geophones 28, as shown by the dashed arrow 27.

FIGURE 4 depicts in a block diagram the component parts and their relationship of a seismic surveying system constructed in accordance with the invention.

Figure 5:
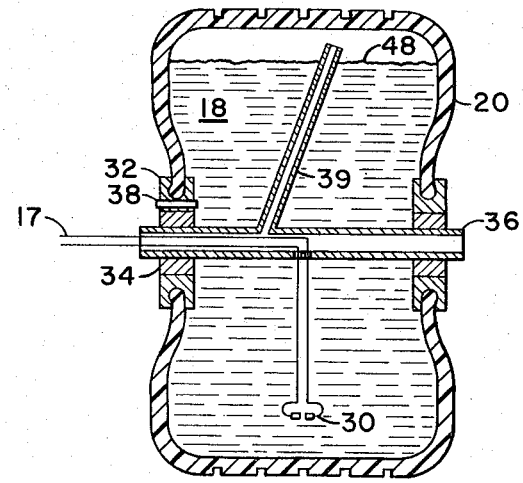
FIGURE 5 is a vertical section along the axis of a hollow rotatable member, such as an oversize tire, filled with a liquid medium, and shown mounted therein a source, such as a spark gap, for generating sound impulses.
Figure 6:
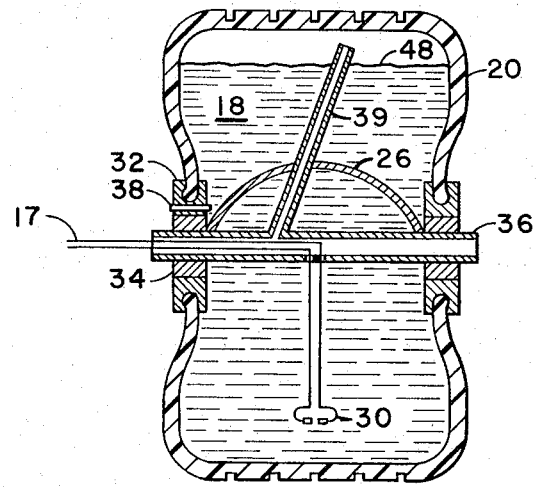
FIGURE 6 is a view similar to that shown in FIGURE 5, but also showing a reflector means mounted within the hollow rotatable member.
Figure 7:
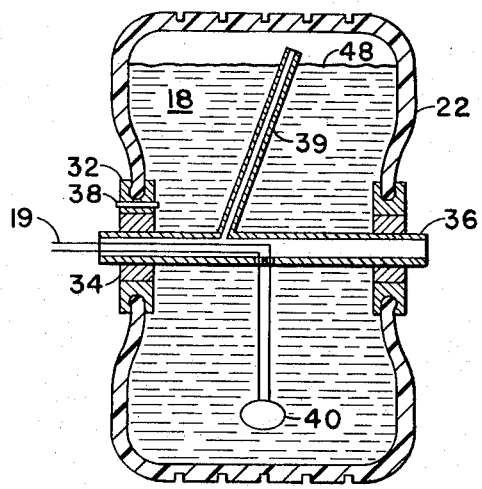
FIGURE 7 is a view also similar to FIGURE 5, but showing a receiver means, such as a hydrophone element, for receiving reflected sound impulses from substrata of interest.

FIGURES 5, 6, and 7 are similar in that they show, in verticle section along the axis, a hollow rotatable member constructed in accordance with and embodying the present invention. FIGURES 5 and 6 show two aspects of the construction of a sound source 30 mounted within a rotatable member, while FIGURE 7 shows the disposition therein of a receiver means 40, such as a hydrophone.

With particular reference to FIGURE 5, it may be noted that the hollow rotatable member 20 is essentially an oversized, specially built tire made of rubber and having a rather large, flat peripheral surface that comes in contact with the ground. In relation to its size, the walls of the tire are relatively thin, allowing thereby for better coupling of the sound impulses into the ground. It will be appreciated that the continuously rotating peripheral surface of the tire acts as a rubber diaphragm for transferring the generated sound impulses to the ground as the tire is continuously being rolled about its axis 36 along the surface of the ground.

The interior of the hollow rotatable member 20 is filled with a noncompressible fluid 18, which may be salt water or fresh water, oil or any other noncompressible liquid medium depending upon the particluar sound source being used for generating sound impulses therein. For example, if the sound source 30 used is a spark gap, as shown in FIGURE 5, the fluid medium may be salt water. Should the sound source 30 be represented by a dome-shaped transducer type of arrangement, such as a metallic plate which is subjected to sudden and violent vibrations, the fluid medium may be fresh water or other noncompressible liquid.

A pair of wires 17 are shown connected to the respective ends of the sound source 30 and are designed for carrying the required electrical energy for sound impulse generation from a suitable power supply 14, which may be mounted on the vehicle 10, as already stated. The power supply 14, may be, for example, a capacitor bank together with its associated circuitry intended for sudden and repeatable discharges of a main discharge capacitor between the electrodes of the sound source 30. The capacitor bank may be discharged in any well known manner as will be appreciated by those skilled in the art, such as by the use of a triggered spark gap or a thyratron switch. It should also be appreciated that the two wires 17 are provided with a suitable insulating material (not shown) and may be conveniently admitted into the interior of the rotatable member 20 through suitable apertures provided in the stationary axle 36.

In accordance with well understood principles of sound impulse transmission, the sound source 30 is preferably positioned in close proximity with the peripheral wall of the member 20, substantially as shown in FIGURE 5. It will also be appreciated by those skilled in the art that any sound impulse generated by the sound source 30, as by the sudden discharge of energy between the electrodes in the form of a spark, will send sound impulses in all directions and those sound impulses that are being sent up through the fluid medium 18 are then going to be reflected by the upper surface 48 of the medium 18, serving as an excellent reflector. If for any reason it may be desirable to use specially shaped and contoured reflectors, the arrangement as shown in FIGURE 6 may be the preferable one. As may be noted in FIGURE 6 an independent reflector 26 is also built inside the hollow interior of the rotatable member 20 and is disposed diametrically to the sound source 30 and in spaced apart relation thereto. The reflector 26 may be hard material such as, for example, steel and may be conveniently attached to the stationary axle 36 of the rotatable member 20. It will also be appreciated by those skilled in the art that by properly selecting the shape of the reflector 26 and its disposition with respect to the sound source 30, the resultant sound waves being coupled into the ground may be varied in frequency and wave length in accordance with the requirements of the terrain to be surveyed and as to what deph the sound impulses are to generate into the ground.

As may be noted, the hollow rotatable member 20 is mounted on a suitable rim, such as a tire rim 32, preferably made of metal, which is then secured to a suitable bearing and seal means 34 designed to permit rotation of the member 20 about the stationary axis 36 in such a manner that the fluid medium 18 contained therein is not allowed to leak out. Such bearing and seal means 34 may, for example, be represented by convenient ball-bearing mechanisms having appropriate O seals disposed about the bearing assembly. The salt water, or other fluid medium 18, may be conveniently admitted into the interior of the hollow rotatable member 20 via a filler inlet 38, provided in the rim 32. To permit the escaping of the air from the interior of the member 20 as the same is being filled with the liquid, a suitable breather pipe 39 may be provided, having connection to the atmosphere through the stationary axle 36, subsequently as shown. After the member 20 has been filled with a liquid medium 18, the filler inlet 38 may be conveniently sealed off, as by a cap (not shown). FIGURE 7 shows a receiver 40 which may be a hydrophone designed to receive reflected pulses and generating, responsive thereto, electrical signals which are then fed by the respective wire connections 19 to a recording apparatus 16, mounted on the vehicle 10.

The seismic survey charts or records are, of course, obtained in a manner well known to those skilled in the art and this does not per se form a part of this invention. As may be appreciated from the above disclosure, the present invention provides an improved and highly efficient seismic profiling system for obtaining continuous seismic profiling records over land terrain in much the same manner as done over water. The improved method of obtaining seismic profiling record permits precision mapping of any strata of interest below the surface of the earth in a simple and highly economical manner. Particularly, the present invention eliminates the need for continuous lifting and moving the sound producing source from station to station over the surface intended to be charted.

Since certain changes may be made in the above described seismic survey system and method without departing from the scope herein involved, it is intended that all matter contained in the above description or shown in the accompanying drawings shall be interpreted in an illustrative and not in a limiting sense.

What is claimed is:

1. A seismic surveying system comprising a means for generating sound impulses mounted in a liquid medium contained within a first hollow rotatable member; a means for receiving reflected sound impulses mounted in a liquid medium contained within a second hollow rotatable member positioned in spaced apart relationship to said first member; and means for converting said received reflected sound impulses into a survey record.

2. A seismic surveying system comprising a means for generating sound impulses mounted in a liquid medium contained within a first hollow rotatable member; a means for receiving reflected sound impulses mounted in a liquid medium contained within a second hollow rotatable member; said first and second rotatable members defining also the means of motion for a vehicular member mounted thereon; and means mounted on said vehicular member for converting said received reflected sound impulses into a survey record.

3. A seismic surveying system comprising a means for generating sound impulses mounted in a liquid medium contained within a first rotatable member; a means for receiving reflected sound impulses mounted in a liquid medium contained within a second rotatable member; said first and second members positioned in spaced apart relationship relative to one another and being designed for motion along the surface of land; means for imparting said motion to said members; and means for converting said received reflected sound impulses into a survey record.

4. A seismic surveying system comprising a means for generating sound impulses mounted in a liquid medium contained within a first hollow rotatable member; reflector means mounted within said member and at a distance from said means for generating sound impulses; means for receiving reflected sound impulses mounted in a liquid medium contained with a second hollow rotatable member; said members positioned in spaced apart relationship relative to one another and being provided with means of locomotion to travel along the surface of the earth; and means for converting said received reflected sound impulses into a survey record.

5. A seismic surveying system comprising a sound source disposed in a liquid medium contained within a first hollow rotatable member; a transducer mounted in a liquid medium contained within a second hollow rotatable member; said members being positioned in spaced apart relationship relative to one another and being provided with means to impart rotary motion thereto; means for supplying power for said sound source for generating sound impulses; and means including circuit means for converting received sound impulses into a survey record.

References Cited by the Examiner

UNITED STATES PATENTS

| | | | |
|---|---|---|---|
| 2,559,227 | 7/1951 | Rieber | 181—.5 |
| 2,994,397 | 8/1961 | Huckabay | 181—.5 |
| 3,105,424 | 10/1963 | Dion et al. | 94—50 |
| 3,233,694 | 2/1966 | Roever | 181—.5 |

BENJAMIN A. BORCHELT, *Primary Examiner.*

SAMUEL FEINBERG, *Examiner.*

G. H. GLANZMAN, *Assistant Examiner.*